United States Patent
Nagpal et al.

(10) Patent No.: US 10,606,763 B2
(45) Date of Patent: *Mar. 31, 2020

(54) METHODS AND SYSTEMS FOR SELECTIVE ENCRYPTION AND SECURED EXTENT QUOTA MANAGEMENT FOR STORAGE SERVERS IN CLOUD COMPUTING

(71) Applicant: INTERNATIONAL BUSINESS MACHINES CORPORATION, Armonk, NY (US)

(72) Inventors: Abhinay R. Nagpal, Pune (IN); Sandeep R. Patil, Pune (IN); Sri Ramanathan, San Ramon, CA (US); Divyank Shukla, Pune (IN); Matthew B. Trevathan, Roswell, GA (US)

(73) Assignee: International Business Machines Corporation, Armonk, NY (US)

( * ) Notice: Subject to any disclaimer, the term of this patent is extended or adjusted under 35 U.S.C. 154(b) by 43 days.

This patent is subject to a terminal disclaimer.

(21) Appl. No.: 15/636,155

(22) Filed: Jun. 28, 2017

(65) Prior Publication Data

US 2017/0300428 A1    Oct. 19, 2017

Related U.S. Application Data

(63) Continuation of application No. 13/099,431, filed on May 3, 2011, now Pat. No. 9,712,495.

(51) Int. Cl.
*G06F 12/14* (2006.01)
*H04L 29/06* (2006.01)
(Continued)

(52) U.S. Cl.
CPC .......... *G06F 12/1408* (2013.01); *G06F 3/067* (2013.01); *G06F 3/0622* (2013.01);
(Continued)

(58) Field of Classification Search
CPC ............................. G06F 12/1408; G06F 3/067
See application file for complete search history.

(56) References Cited

U.S. PATENT DOCUMENTS

| 5,933,498 | A | 8/1999 | Schneck et al. |
| 6,598,161 | B1 | 7/2003 | Kluttz et al. |
| (Continued) | | | |

OTHER PUBLICATIONS

Trusted Computing Group, "Cloud Computing and Security—A Natural Match", Trusted Computing Group, Apr. 2010, pp. 1-5.
(Continued)

*Primary Examiner* — Maung T Lwin
*Assistant Examiner* — Suman Debnath
(74) *Attorney, Agent, or Firm* — James Nock; Andrew M. Calderon; Roberts Mlotkowski Safran Cole & Calderon, P.C.

(57) ABSTRACT

Methods and systems for selective encryption and secured extent quota management for storage servers in cloud computing are provided. A method includes associating at least one secure storage disk and at least one non-secure storage disk to a virtual disk, and associating the virtual disk to an application to allow access of the at least one secure storage disk and the at least one non-secure storage disk. The method further includes accessing the at least one secure storage disk and the at least one non-secure storage disk based on the associating of the virtual disk to the application, to write or read confidential and non-confidential data associated with the application into a respective one of the at least one secure storage disk and the at least one non-secure storage disk.

15 Claims, 9 Drawing Sheets

(51) Int. Cl.
*G06F 3/06* (2006.01)
*G06F 12/1009* (2016.01)

(52) U.S. Cl.
CPC ........ *G06F 3/0659* (2013.01); *G06F 12/1009* (2013.01); *H04L 63/04* (2013.01); *G06F 2212/1052* (2013.01); *G06F 2212/154* (2013.01)

(56) References Cited

U.S. PATENT DOCUMENTS

| | | | |
|---|---|---|---|
| 7,428,636 | B1 | 9/2008 | Waldspurger et al. |
| 7,484,107 | B2 | 1/2009 | Forlenza et al. |
| 7,721,115 | B2 | 5/2010 | Luttmann et al. |
| 7,808,399 | B2 | 10/2010 | McVey |
| 7,924,442 | B2 | 4/2011 | Watabe |
| 2006/0227756 | A1* | 10/2006 | Rustagi ............ G06F 21/10 370/342 |
| 2008/0250217 | A1 | 10/2008 | Kershaw et al. |
| 2009/0320048 | A1 | 12/2009 | Watt et al. |
| 2010/0044444 | A1 | 2/2010 | Jain et al. |
| 2010/0088305 | A1* | 4/2010 | Fournier ........... G06F 17/30675 707/706 |
| 2010/0211781 | A1 | 8/2010 | Auradkar et al. |
| 2010/0211782 | A1 | 8/2010 | Auradkar et al. |
| 2010/0257372 | A1 | 10/2010 | Seifert |
| 2010/0325199 | A1 | 12/2010 | Park et al. |
| 2011/0264925 | A1 | 10/2011 | Russo et al. |
| 2011/0277013 | A1* | 11/2011 | Chinta ............... G06F 21/6218 726/1 |

OTHER PUBLICATIONS

Tooley, "Selective Encryption to the Cloud Via a +X Trigger", Posted on Aug. 9, 2010, pp. 1-5.
Mell et al., "The NIST Definition of Cloud Computing", Version 15, Oct. 7, 2009 (2 pages).
Li et al., "Developing an Enterprise Cloud Computing Strategy", IT@Intel White Paper, Jan. 2009, pp. 1-16.
Working Draft American Standard, "Information technology—SCSI Block Commands-2 (SBC-2)", Project T10/1417-D, Revision 16, Nov. 13, 2004, 145 Pages.

* cited by examiner

| Byte\Bit | 7 | 6 | 5 | 4 | 3 | 2 | 1 | 0 |
|---|---|---|---|---|---|---|---|---|
| 0 | \multicolumn{8}{c}{OPERATION CODE (8Ah)} ||||||||
| 1 | \multicolumn{3}{c}{WRPROTECT} | DPO | FUA | Reserved | FUA_NV | Reserved |
| 2 | (MSB) | \multicolumn{7}{c}{} |||||||
| ... | \multicolumn{8}{c}{LOGICAL BLOCK ADDRESS} ||||||||
| 9 | \multicolumn{7}{c}{} | (LSB) |||||||
| 10 | (MSB) | \multicolumn{7}{c}{} |||||||
| ... | \multicolumn{8}{c}{TRANSFER LENGTH} ||||||||
| 13 | \multicolumn{7}{c}{} | (LSB) |||||||
| 14 | Restricted | \multicolumn{3}{c}{Reserved} | \multicolumn{4}{c}{GROUP NUMBER} ||||||
| 15 | \multicolumn{8}{c}{CONTROL} ||||||||

WRITE (16) command    FIG. 5

| Byte\Bit | 7 | 6 | 5 | 4 | 3 | 2 | 1 | 0 |
|---|---|---|---|---|---|---|---|---|
| 0 | \multicolumn{8}{c}{OPERATION CODE (88h)} ||||||||
| 1 | \multicolumn{3}{c}{RDPROTECT} | DPO | FUA | Reserved | FUA_NV | Reserved |
| 2 | (MSB) | \multicolumn{7}{c}{} |||||||
| ... | \multicolumn{8}{c}{LOGICAL BLOCK ADDRESS} ||||||||
| 9 | \multicolumn{7}{c}{} | (LSB) |||||||
| 10 | (MSB) | \multicolumn{7}{c}{} |||||||
| ... | \multicolumn{8}{c}{TRANSFER LENGTH} ||||||||
| 13 | \multicolumn{7}{c}{} | (LSB) |||||||
| 14 | Restricted | \multicolumn{3}{c}{Reserved} | \multicolumn{4}{c}{GROUP NUMBER} ||||||
| 15 | \multicolumn{8}{c}{CONTROL} ||||||||

READ (16) command    FIG. 6

700

| Byte\Bit | 7 | 6 | 5 | 4 | 3 | 2 | 1 | 0 |
|---|---|---|---|---|---|---|---|---|
| 0 | \multicolumn{8}{c}{OPERATION CODE (9Eh)} |
| 1 | \multicolumn{3}{c}{Reserved} | \multicolumn{5}{c}{SERVICE ACTION (10h)} |
| 2 | (MSB) | | | | | | | |
| ... | \multicolumn{8}{c}{LOGICAL BLOCK ADDRESS} |
| 9 | | | | | | | | (LSB) |
| 10 | (MSB) | | | | | | | |
| ... | \multicolumn{8}{c}{ALLOCATION LENGTH} |
| 13 | | | | | | | | (LSB) |
| 14 | \multicolumn{7}{c}{Reserved} | PMI |
| 15 | \multicolumn{8}{c}{CONTROL} |

READ CAPACITY (16) command

FIG. 7

METHODS AND SYSTEMS FOR SELECTIVE ENCRYPTION AND SECURED EXTENT QUOTA MANAGEMENT FOR STORAGE SERVERS IN CLOUD COMPUTING

TECHNICAL FIELD

The present invention generally relates to cloud computing, and more particularly, to methods and systems for selective encryption and secured extent quota management for storage servers in cloud computing.

BACKGROUND

Information technology is changing rapidly and now forms an invisible layer that increasingly touches nearly every aspect of business and social life. An emerging computer model known as cloud computing addresses the explosive growth of Internet-connected devices, and complements the increasing presence of technology in today's world. Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

Cloud computing is massively scalable, provides superior user experience, and is characterized by new, Internet-driven economics. In one perspective, cloud computing involves storage and execution of business data inside a cloud which is a mesh of inter-connected data centers, computing units and storage systems spread across geographies.

Storage controllers typically manage storage disks or Managed Disks (MDisks) at a back end of a cloud. Storage controllers with similar operational characteristics are combined, and are further combined with MDisks with similar operational characteristics (e.g., rotations per minute (RPM), etc.) in a particular MDisk group. Such a group is used to create a Virtual Disk (VDisk), which is mapped or masked to a user application of a cloud computing device.

SUMMARY

In a first aspect of the invention, a method includes associating at least one secure storage disk and at least one non-secure storage disk to a virtual disk, and associating the virtual disk to an application to allow access of the at least one secure storage disk and the at least one non-secure storage disk. The method further includes accessing the at least one secure storage disk and the at least one non-secure storage disk based on the associating of the virtual disk to the application, to write or read confidential and non-confidential data associated with the application into a respective one of the at least one secure storage disk and the at least one non-secure storage disk.

In another aspect of the invention, a system implemented in hardware, includes a computer infrastructure operable to associate a virtual disk to an application on a computing device, the virtual disk associated with at least one encrypting storage disk and at least one non-encrypting storage disk, and used by the application to access of the at least one encrypting storage disk and the at least one non-encrypting storage disk. The computer infrastructure is further operable to access one of the at least one encrypting storage disk and the at least one non-encrypting storage disk based on the associating of the virtual disk to the application, to write or read confidential and non-confidential data associated with the application into a respective one of the at least one encrypting storage disk and the at least one non-encrypting storage disk.

In an additional aspect of the invention, a computer program product includes a computer usable storage medium having readable program code embodied in the storage medium, the computer program product includes at least one component operable to associate at least one secure storage disk and at least one non-secure storage disk to a virtual disk. The at least one component is further operable to associate the virtual disk to an application to allow access of the at least one secure storage disk and the at least one non-secure storage disk, and access the at least one secure storage disk and the at least one non-secure storage disk based on the associating of the virtual disk to the application, to write or read confidential and non-confidential data associated with the application into a respective one of the at least one secure storage disk and the at least one non-secure storage disk.

In a further aspect of the invention, a method of deploying a system for selective encryption and secured extent quota management for storage servers, includes providing a computer infrastructure, being operable to receive input data. The computer infrastructure is further operable to determine whether the received input data is confidential, and send one of an encryption command and a non-encryption command to a storage controller based on whether the received input data is confidential.

In another aspect of the invention, a computer system for selective encryption and secured extent quota management for storage servers, the system includes a CPU, a computer readable memory and a computer readable storage media. First program instructions associate at least one encrypting storage disk and at least one non-encrypting storage disk to a virtual disk, and second program instructions associate the virtual disk to an application on a computing device to allow access of the at least one encrypting storage disk and the at least one non-encrypting storage disk. Third program instructions to access the at least one encrypting storage disk based on an encryption command received from the application, to write or read confidential data associated with the application into the at least one encrypting storage disk, and fourth program instructions access the at least one non-encrypting storage disk based on a non-encryption command received from the application, to write or read non-confidential data associated with the application into the at least one non-encrypting storage disk. The first, second, third, and fourth program instructions are stored on the computer readable storage media for execution by the CPU via the computer readable memory.

BRIEF DESCRIPTION OF THE SEVERAL VIEWS OF THE DRAWINGS

The present invention is described in the detailed description which follows, in reference to the noted plurality of drawings by way of non-limiting examples of exemplary embodiments of the present invention.

FIGS. 5-7 depict exemplary commands for selective encryption and secured extent quota management for storage servers in cloud computing.

DETAILED DESCRIPTION

Figure 1:
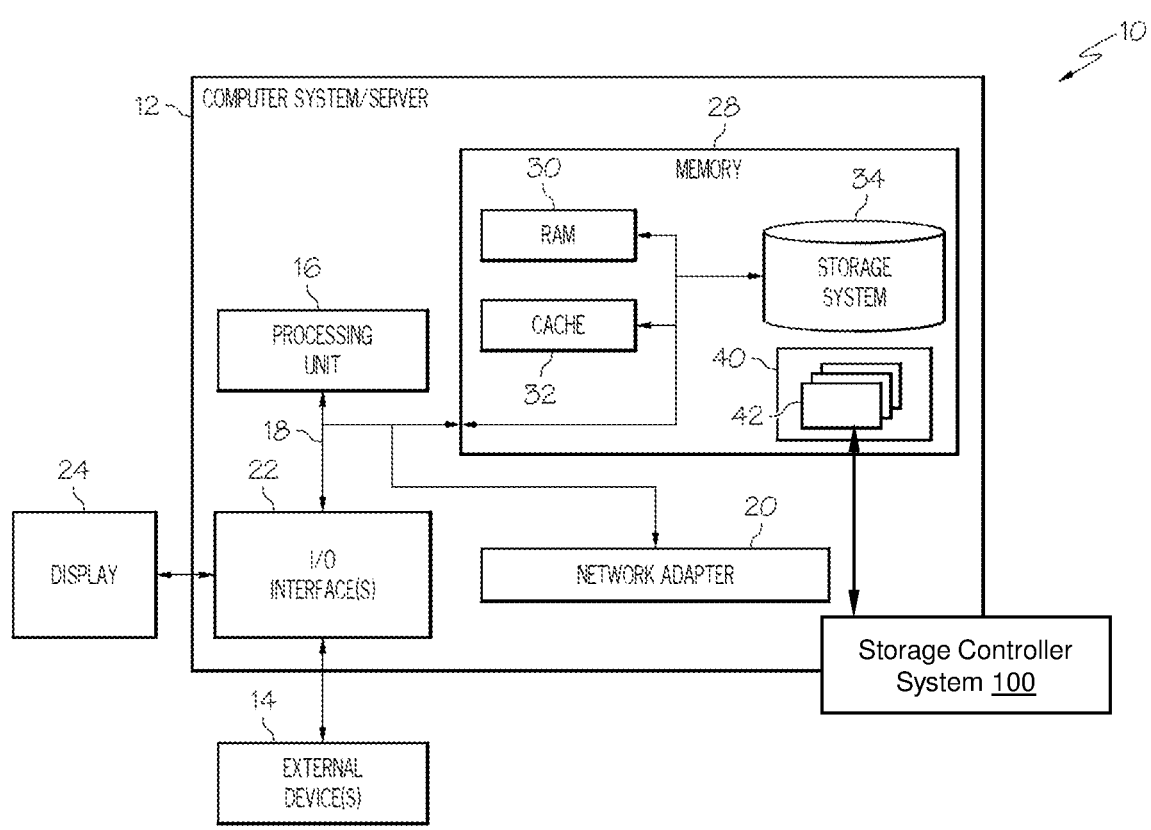
FIG. 1 depicts a cloud computing node according to an embodiment of the present invention.

The present invention generally relates to cloud computing, and more particularly, to methods and systems for selective encryption and secured extent quota management for storage servers in cloud computing. In accordance with aspects of the invention, a user of an application on a cloud computing device can input confidential (e.g., personal) data into the application to, for example, facilitate a third party transaction over a cloud computing environment. In embodiments, a storage controller system may allocate extents (e.g., atomic units of storage) or areas of secure, encrypting storage disks or Managed Disks (MDisks) and non-secure, non-encrypting storage disks or MDisks, to a Virtual Disk (VDisk). In embodiments, the storage controller system may allocate the VDisk such that a predetermined percentage and/or a predetermined number of extents of the VDisk include extents of encrypting MDisks, while the rest of the VDisk includes non-encrypting MDisks. The storage controller system can then map or mask the VDisk to the application on the cloud computing device for use by the application. This allocation and mapping may be referred to as "secure extent quota management."

In embodiments, after the storage controller system maps the VDisk to the application, the application can send an encryption command to the storage controller system so that confidential data is written to, or read from, encrypting MDisks allocated to secure extents of the VDisk. Similarly, the application may also send a non-encryption command to the storage controller system so that non-confidential data is written to, or read from, non-encrypting MDisks allocated to non-secure extents of the VDisk. In this manner, implementations of the invention optimally utilize encrypting MDisks in a heterogeneous Storage Area Network (SAN) environment for maximum security, with non-confidential data targeted for non-encrypting MDisks. In this way, advantageously, the present invention enables the application on the cloud computing device to have confidential data selectively encrypted. Accordingly, the application is not required to have all inputted data (e.g., non-confidential data) encrypted, which further increases utilization of the encrypting MDisks.

Cloud Computing

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

For convenience, the Detailed Description includes the following definitions which have been derived from the "Draft NIST Working Definition of Cloud Computing" by Peter Mell and Tim Grance, dated Oct. 7, 2009, which is cited in an IDS filed herewith, and a copy of which is attached thereto.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16. In embodiments, the computer system/server 12 comprises or communicates with a storage controller system 100 as described in greater detail herein. For example, the storage controller system 100 provides a method and a system for providing secured extents quota management and selective encryption for storage servers in a cloud computing environment. Under the present invention, the storage controller system 100 can configure a virtual disk having encrypted and non-encrypted sections in a single logical unit number (LUN), and can map the sections to a host application of a mobile computing device. In embodiments, the storage controller system 100 may configure an address map of the virtual disk in terms of percentage of secured extents or encrypted sections. In embodiments, once the storage controller system 100 creates the address map, the storage controller system 100 maps the virtual disk to the host application. Only confidential data is placed in the secure extents to optimally utilize physical, encrypting storage disks corresponding to the virtual secure extents. In yet other embodiments, the host application can distinguish confidential or non-confidential data and access the encrypting storage disks to ensure optimal data security.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein. For example, the program modules 42 can control the storage controller system 100, in order to optimally allocate encrypting and non-encrypting Managed Disks (MDisks), to a Virtual Disk (VDisk) mapped for use by an application on a mobile computing device, e.g., the cellular telephone 54A, the laptop computer 54C, and/or the automobile computer system 54N, in FIG. 2.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
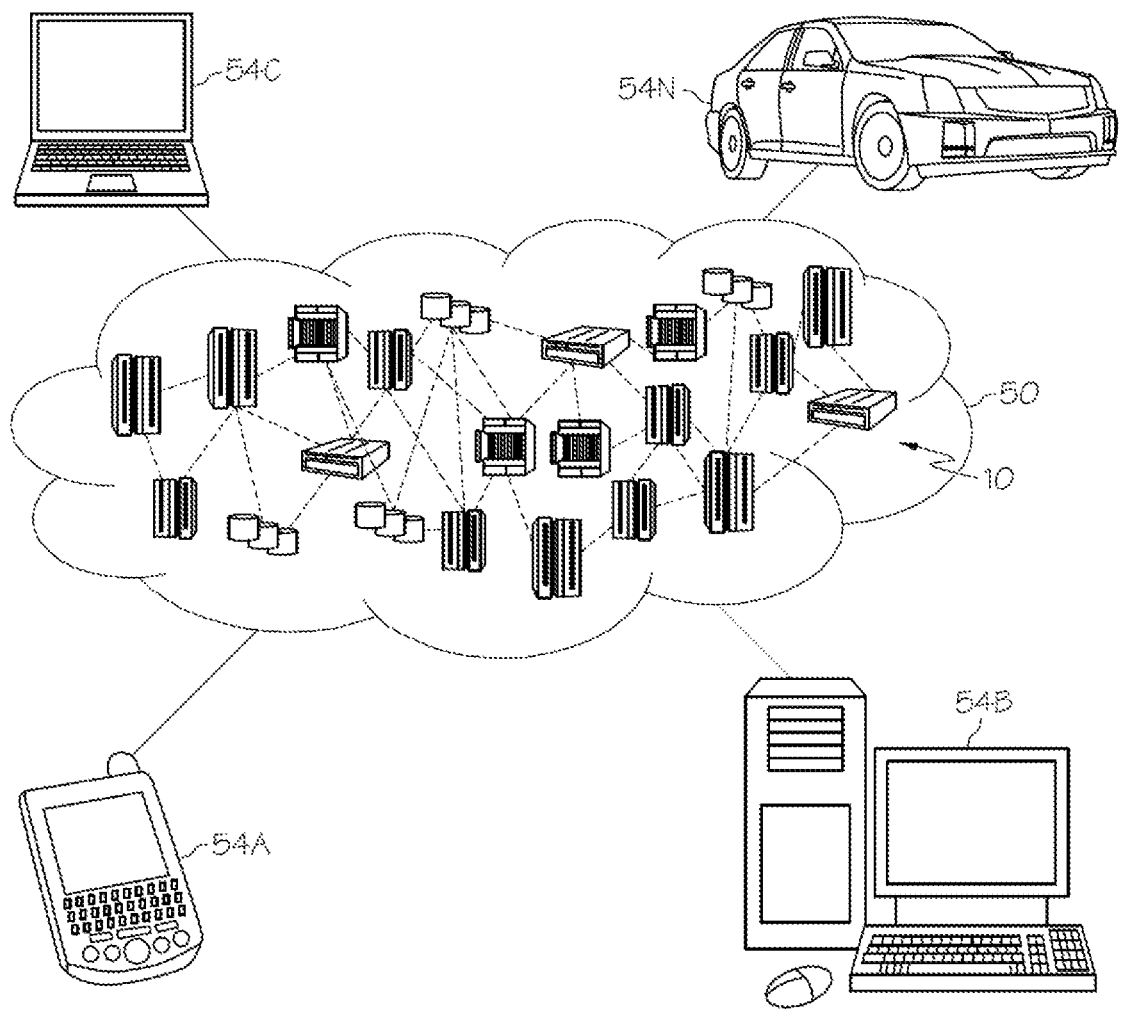
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
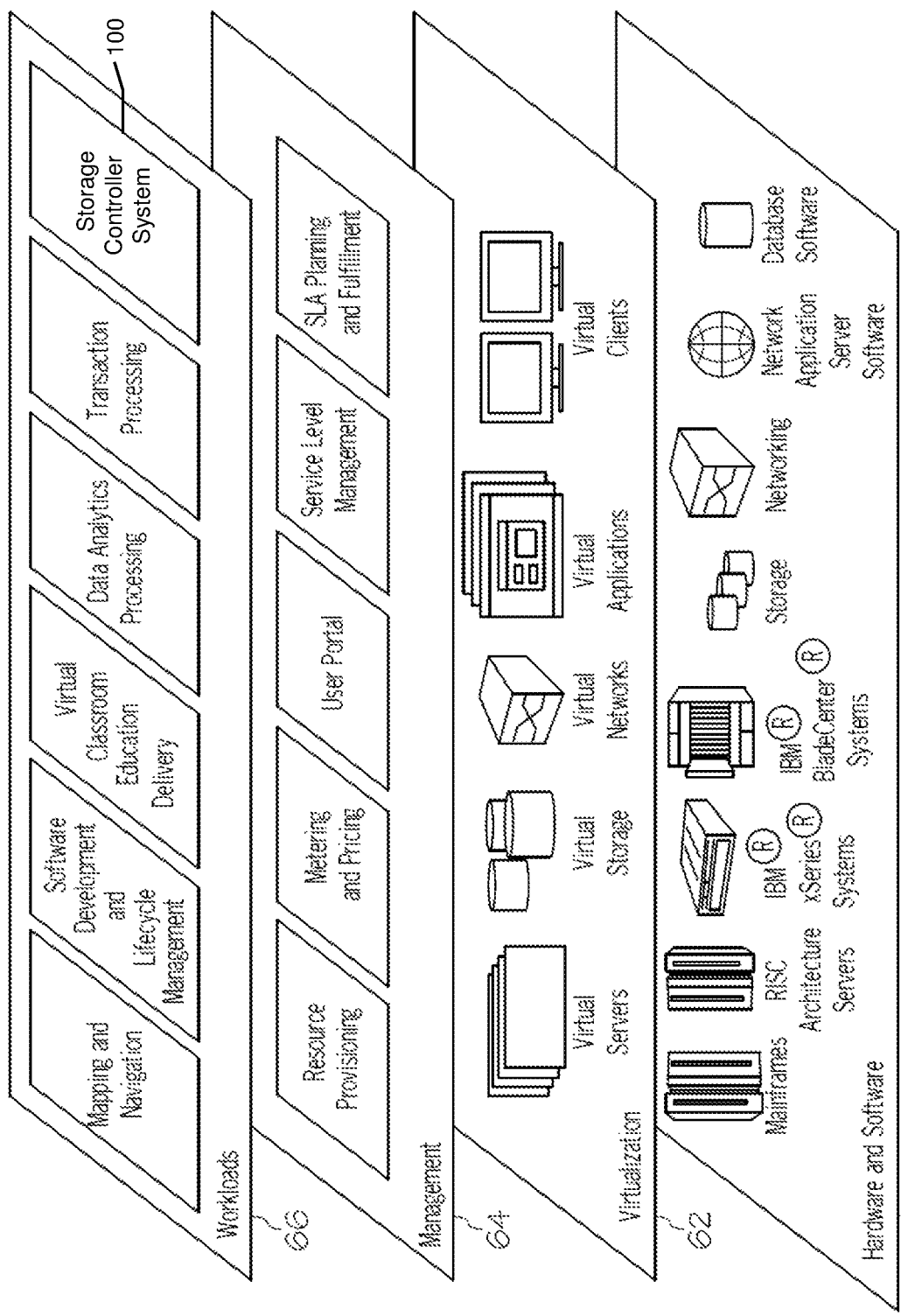
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide)

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and the storage controller system 100. In embodiments, the storage controller system 100 of the present invention is smart enough to use hints from host applications (e.g. IBM® Lotus Notes® and/or web site data forms) that are using storage disks, in order to take selected portions of the application, e.g., selected fillable fields, and segregate them into either secure or non secure disks, depending on the commands. (IBM and Lotus Notes are trademarks of International Business Machines Corporation registered in many jurisdictions worldwide.) The storage controller system 100 is now aware of the priorities of data or the confidentiality aspect of the data, affecting the host application. This leads to the storage controller system 100 providing different treatment to confidential data as to non-confidential data leading to improved security in the data center. This clearly improves data center security audits and prevents miss-happenings. Also, storage administrators using self-encrypting storage disks, in back-end controllers, of the present invention will obtain optimal utilization since the underlying controllers will virtualize their encryption capability to the track level granularity.

In embodiments, the storage controller system 100 can also control where (e.g., which of the MDisks) cloud consumer data in the cloud computing environment 50 is targeted. For example, in the cloud computing environment 50, users can input cloud consumer data into applications on mobile computing devices, such as the cellular telephone 54A, the laptop computer 54C, and/or the automobile computer system 54N, in FIG. 2. In embodiments, the users and/or the applications of the mobile computing devices may tag the cloud consumer data as confidential in which scenario, the storage controller system 100 causes the applications to include the confidential cloud consumer data in encryption commands sent to storage controllers. In this way, the encryption commands indicate to the storage controllers that confidential cloud consumer data should be read from, or written to, encrypting MDisks allocated to a VDisk mapped or masked to the applications. In this manner, implementations of the invention allow the secure encrypting MDisks to encrypt and store the confidential cloud consumer data; instead of having the non-secured, non-encrypting MDisks store the confidential cloud consumer data.

More specifically, a user of an application on a mobile computing device (e.g., the cellular telephone 54A, the laptop computer 54C, and/or the automobile computer system 54N) can input confidential (e.g., personal) data into the application to, for example, facilitate a transaction with a third party over the cloud computing environment 50. However, a traditional storage controller of a cloud computing environment may not write the inputted confidential data to an encrypting storage disk or Managed Disk (MDisk) since the traditional storage controller does not account for encrypting capabilities of MDisks when allocating such disks to a Virtual Disks (VDisk) mapped for the application. Accordingly, the traditional storage controller can also fail to inform the application of the encrypting capabilities of the MDisks, even if the user of the application wants to have a particular percentage of the inputted confidential data to be encrypted and stored in an encrypting MDisk for security reasons.

However, implementations of the invention address these challenges by providing the storage controller system 100 that allocates encrypting and non-encrypting MDisks to extents (e.g., areas) of a VDisk with a single logical unit number (LUN). The storage controller system 100 maps the VDisk to the application on the mobile computing device, which is referred to as "secure extent quota management." For example, the storage controller system 100 of the present invention can configure an address map of a VDisk to include a predetermined percentage (e.g., 30%) of encrypting MDisks ("a secure disk quota"), while the rest of the address map includes non-encrypting MDisks. After the storage controller system 100 maps the VDisk to the application, the application may issue an encryption command (possibly including the inputted confidential data) to the storage controller system 100 such that confidential data is written to, or read from, the encrypting MDisks allocated to secure extents of the VDisk. This ensures that the encrypting MDisks are optimally utilized in a heterogeneous Storage Area Network (SAN) environment for maximum security, and that non-confidential data is targeted for the non-encrypting MDisks. Advantageously, the present invention enables the storage controller system 100 to better and more securely manage the MDisks in the heterogeneous SAN environment. Further, the present invention allows the application on the mobile computing device to have inputted confidential data selectively encrypted, and thus, the application is not required to have all inputted data (e.g., non-confidential data) encrypted. This, in turn, increases utilization of the encrypting MDisks.

Figure 4A:
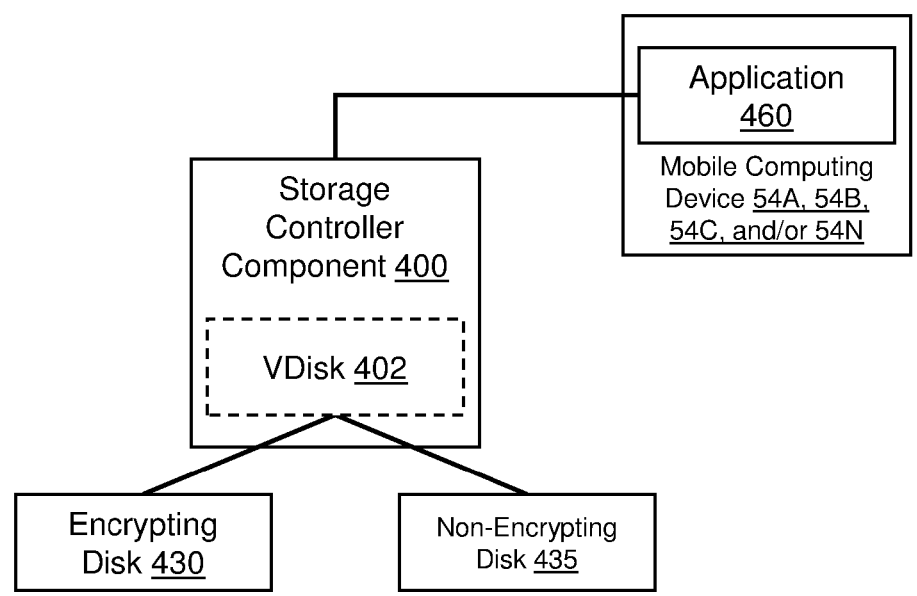
FIGS. 4A-4B depict an illustrative environment according to an embodiment of the present invention.

FIG. 4A depicts an illustrative environment according to embodiments of the present invention. In embodiments, the storage controller system 100 can include a storage controller component 400, an encrypting disk 430, a non-encrypting disk 435, and the mobile computing device 54A, 54B, 54C, and/or 54N. The components 400, 430, and 435 may be implemented in the computer system/server 12 of FIG. 1, for example. The computer system/server 12 can be in the cloud computing node 10 and practiced in distributed cloud computing environments. Alternatively, some of the components 400, 430, 435, particularly the disks 430, 435, may be implemented external to the computer system/server 12, and may be implemented in a separate computer system/server. The mobile computing device 54A, 54B, 54C, and/or 54N can be the cellular telephone 54A, the desktop computer 54B, the laptop computer 54C, and/or the automobile computer system 54N, as discussed in FIG. 2. The mobile computing device 54A, 54B, 54C, and/or 54N may include an application 460 that receives input data (e.g., confidential data) from a user, such as IBM® Lotus Notes® and/or web site data forms. (IBM and Lotus Notes are trademarks of International Business Machines Corporation registered in many jurisdictions worldwide.)

In embodiments, the storage controller component 400 can allocate at least one extent (e.g., an atomic unit of storage) of physical storage disks or Managed Disks (MDisks) in the storage controller system 100, into a MDisk group. The MDisk group may include at least one extent of secure, encrypting MDisks (e.g., the encrypting disk 430) and/or of non-secure, non-encrypting MDisks (e.g., the non-encrypting disk 435). In embodiments, the MDisk group may be allocated so that a predetermined percentage and/or a predetermined number of the MDisk group includes extents of encrypting MDisks. In other words, the MDisk group may be allocated to reach a "secured extents quota." Using the allocated MDisk group, the storage controller component 400 can then create a virtual or non-physical disk (VDisk) 402. The VDisk 402 may be an address map or data structure including addresses of all of the physical MDisks in the MDisk group. Thus, the VDisk 402 can include secure extents with addresses to encrypting MDisks and non-secure extents with addresses to non-encrypting MDisks. After the VDisk 402 is created, the storage controller component 400 may map or masks the VDisk 402 to the application 460. In this way, the application 460 can use the VDisk 402 to access the encrypting and non-encrypting MDisks allocated to the VDisk 402. For example, the application 460 may store the input data into the physical MDisks via the address map that is the VDisk 402.

In accordance with further aspects of the present invention, the user and/or the application 460 can tag the input data as confidential data. Based on whether the input data is confidential or not, the application 460 may send to the storage controller component 400 an encryption command or a non-encryption command. The encryption command can indicate to the storage controller component 400 to write to, or read from, an extent of an encrypting MDisk (e.g., the encrypting disk 430) allocated in the VDisk 402. The non-encryption command can indicate to the storage controller component 400 to write to, or read from, an extent on a non-encrypting MDisk (e.g., the non-encrypting disk 435) allocated in the VDisk 402. In the case of a read command, the storage controller component 400 may use the VDisk 402 to read data from the encrypting and/or non-encrypting disks 430, 435, and return the read data back to the application 460. By including a secured extents quota, the present invention ensures that the application 460 can securely transfer confidential data to and from encrypting MDisks. In addition, the encryption and non-encryption commands of the present invention allows the application 460 to selectively transfer confidential data to and from encrypting MDisks, and non-confidential data to and from non-encrypting MDisks. This increases the utilization of encrypting MDisks for confidential data, and the utilization of non-encrypting MDisks for non-confidential data.

Figure 4B:
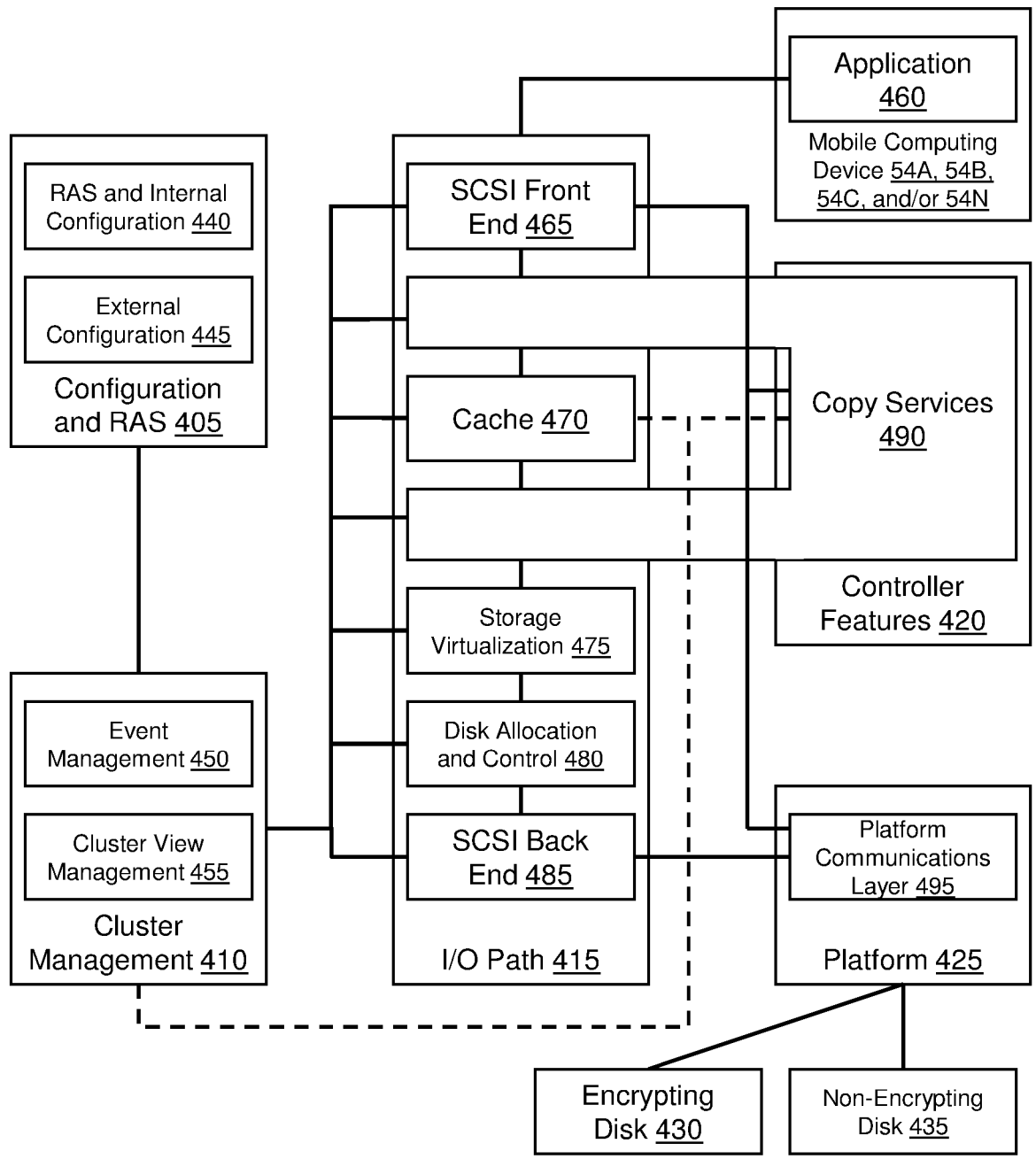

FIG. 4B depicts an illustrative environment according to embodiments of the present invention. In embodiments, the storage controller system 100 can include a configuration and Reliability, Availability, and Serviceability (RAS) component 405, a cluster management component 410, an input/output (I/O) path 415, controller features 420, a platform 425, at least one encrypting disk 430, and at least one non-encrypting disk 435. All of these components 405-435 may be implemented in the computer system/server 12 of FIG. 1, for example. The computer system/server 12 can be in the cloud computing node 10 and practiced in distributed cloud computing environments. Alternatively, some of the components 405-435, particularly the disks 430, 435, may be implemented external to the computer system/server 12, and may be implemented in a separate computer system/server.

In embodiments, the configuration and RAS component 405 can include a RAS and internal configuration component 440 and an external configuration component 445. The RAS and internal configuration component 440 configures internal components (e.g., the cluster management component 410) of the storage controller system 100. In embodiments, the RAS and internal configuration component 440 configures the internal components to include RAS features. For example, RAS features may include those that help to detect and avoid faults in the storage controller system 100, those that allow the system 100 to stay operational even when faults occur, and those that diagnose faults in the system 100. The external configuration component 445 configures components of the storage controller system 100 for use with external components (e.g., the disks 430, 435) of the storage controller system 100. The external configuration component 445 can configure, for instance, the components of the storage controller system 100 to use a logical unit (LU) of the encrypting disk 430, and components of another storage controller system to use another LU of the encrypting disk 430.

In accordance with further aspects of the present invention, the cluster management component 410 can include an event management component 450 and a cluster view management component 455. The event management component 450 generates events in the storage controller system 100. These events may include, for example, informational events (e.g., updates in an operational status of the storage controller system 100) and configuration events (e.g., setting of configuration parameters received from the configuration and RAS component 405). The event management component 450 further manages and sends the events to the other components in the storage controller system 100. Based on the events received from the event management component 450, the cluster view management component 455 creates a layout of the disks 430, 435 used by the storage controller system 100 (and other storage controller systems in a cluster of storage controller systems). Specifically, the layout can include LU's of the disks 430, 435 and can indicate which of the storage controller systems in the cluster use each of the LU's. The cluster management component 410 may further include other cluster management components, such as a component that assigns one of the storage controller systems in the cluster the role of configuring the other storage controller systems in the cluster. In other words, such a component can assign one of the storage controller systems in the cluster to be a configuration node.

In embodiments, the I/O path 415 can include a Small Computer System Interface (SCSI) front end component 465, a cache 470, a storage virtualization component 475, a disk allocation and control component 480, and a SCSI back end component 485. The SCSI front end component 465 receives I/O commands from an application 460 on the mobile computing device 54A, 54B, 54C, and/or 54N. For example, the application 460 may receive input data from a user of the mobile computing device 54A, 54B, 54C, and/or 54N. The user and/or the application 460 can tag the input data as confidential, e.g., personal. The application 460 may then send an encryption command including the confidential input data to the SCSI front end component 465. The encryption command can be a write command and/or a read command that indicates to the I/O path 415 that confidential data is to be written to, or read from, the encrypting disk 430. The encryption command may be a read capacity command that requests from the I/O path 415 a size of secure extents (e.g., the encrypting disk 430) allocated in a Virtual Disk (VDisk) mapped or masked to the application 460. Further, for the input data that is not tagged as confidential, the application 460 can send a non-encryption command, including the input data to the SCSI front end component 465. The non-encryption command may be a write command and/or a read command that indicates to the I/O path 415 that data is to be written to, or read from, the non-encrypting disk 435. The non-encryption command can be a read capacity command that requests from the I/O path 415 a size of non-secure extents (e.g., the non-encrypting disk 435) allocated in a VDisk mapped to the application 460. After processing a read command and/or a read capacity command (that is an encryption command and/or a non-encryption command), the I/O path 415 may send data retrieved from the disks 430, 435, to the application 460.

In accordance with further aspects of the present invention, any data received at the I/O path 415 can be quickly written to the cache 470. This data may include, for example, the I/O commands received from the application 460. In addition, the components of the I/O path 415 and the cluster management component 410 can quickly read data from the cache 470. The quick writes to and reads from the cache 470 may be performed by the controller features 420, specifically, copy services 490 of the controller features 420. The copy services 490 map received and/or requested data to the cache 470, transfer received data to the cache 470, and transfer requested data from the cache 470.

In embodiments, the storage virtualization component 475 manages a virtualization of storage disks or Managed Disks (MDisks) (e.g., the encrypting disk 430 and the non-encrypting disk 435) in the storage controller system 100. More specifically, the storage virtualization component 475 creates a VDisk from a group of combined storage disks (a MDisk group) in the storage controller system 100. The VDisk can be of a predetermined total size, and can include a predetermined number of extents or areas, which also can be of a predetermined size. Each of the extents of the VDisk may be mapped to an extent of a MDisk in the MDisk group, and the storage virtualization component 475 may include a look-up table of this mapping for each of the extents of the VDisk. The storage virtualization component 475 also maps or masks a VDisk to a user application, such as the application 460, for use by the user application. When mapping a VDisk to a user application, the storage virtualization component 475 can review the VDisk and ensure that the particular user application is not mapped with a VDisk including a majority of secure extents, e.g., mappings to encrypting MDisks. This is especially the case if the user application does not involve confidential data. In this manner, a single user application is not able to dominate a majority of secure extents in the storage controller system 100.

In accordance with further aspects of the present invention, the disk allocation and control component 480 creates a MDisk group that is virtualized by the storage virtualization component 475. Capacities of MDisks are divided into extents or areas, which each include a predetermined size. These extents and/or entire MDisks can be allocated to a MDisk group. To create a MDisk group with secure extents (e.g., encrypting MDisks), the disk allocation and control component 480 allocates MDisks to the MDisk group based on their encryption attributes. For example, the disk allocation and control component 480 can allocate encrypting MDisks (e.g., the encrypting disk 430) to the MDisk group such that a predetermined percentage (e.g., 30%) and/or a predetermined size (e.g., 50 Mb) of the MDisk group is allocated with encrypting MDisks. Such a predetermined percentage or a predetermined size may be a secure disk quota for each MDisk group. The disk allocation and control component 480 then can allocate non-encrypting MDisks (e.g., the non-encrypting disk 435) to the MDisk group such that a remaining percentage of the MDisk group is allocated with non-encrypting MDisks. Mappings of each MDisk group and its allocated MDisks can be maintained in a look-up table in the disk allocation and control component 480. This optimal disk allocation enables each MDisk group (and subsequently each VDisk) to include secure extents such that a user application (e.g., the application 460) may be able to save confidential data on these secure extents rather than on non-secure extents. Similarly, the optimal disk allocation of the present invention enables each MDisk group and VDisk to include non-secure extents such that a user application can save non-confidential data on non-secure extents instead of secure extents, which leads to better utilization of the secure extents and cost savings for users as non-encrypting MDisks are faster than encrypting MDisks. Moreover, saving non-confidential data on non-secure extents ensures that this non-confidential data is visible to and available for sharing with other components and/or users, rather than being unnecessarily encrypted and hidden in secure extents.

In embodiments, the disk allocation and control component 480 further receives I/O commands, via the SCSI front end component 465, from a user application, e.g., the application 460. Based on whether a received I/O command is an encryption command or a non-encryption command, the disk allocation and control component 480 controls whether to access an encrypting MDisk (e.g., the encrypting disk 430) or a non-encrypting MDisk (e.g., the non-encrypting disk 435). For example, when the disk allocation and control component 480 receives an encryption write command including confidential input data, the disk allocation and control component 480 is instructed to write the confidential input data into an encrypting MDisk. If the encrypting MDisk is full before the input data is written into the encrypting MDisk, the disk allocation and control component 480 may return a disk full signal to the application 460 and may not write the input data into the encrypting MDisk. When the disk allocation and control component 480 receives an encryption read command including a logical block address (LBA), the disk allocation and control component 480 is instructed to decrypt and read confidential input data from the LBA of an encrypting MDisk. To access encrypting MDisks, the disk allocation and control component 480 can maintain a look-up table including keys and information (e.g., IP address) regarding each encrypting MDisk in the storage controller system 100. Advantageously, the disk allocation and control component 480 provides optimal targeting of confidential and non-confidential data to encrypting MDisks and non-encrypting MDisks, respectively, and provides optimal utilization of these MDisks.

In accordance with further aspects of the present invention, the SCSI back end component 485 controls access to external storage systems (e.g., the disks 430, 435) of the storage controller system 100. The SCSI back end component 485 also transfers data between the components of the I/O path 415 and the external storage system. In embodiments, the SCSI band end component 485 can perform error recovery procedures to recover previous data due to detected data errors in the storage controller system 100. Such procedures are instigated as and when RAS features of the SCSI back end component 485 detect that local data includes an error or fault and requires a recovery of previous data, e.g., from the external storage systems.

In embodiments, the platform 425 can include a platform communications layer 495. The platform communications layer 495 is an interface between the SCSI back end component 485 and external storage systems (e.g., the disks 430, 435) of the storage controller system 100. For example, the platform communications layer 495 can transfer data between the SCSI back end components and the disks 430, 435, and can translate file transfer protocols of the SCSI back end components and the disks 430, 435.

As will be appreciated by one skilled in the art, aspects of the present invention, including the storage controller system 100 and the functionality provided therein, may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIGS. 5-7 depicts exemplary commands for selective encryption and secured extent quota management for storage servers in cloud computing. In embodiments, these commands can be generated in a grouping function of a user application (e.g., the application 460 in FIGS. 4A-4B). In embodiments, the grouping function may be a Small Computer System Interface (SCSI) function that allows user applications to group commands with similar characteristics and to generate commands in a SCSI group. Such commands can include a SCSI write command, a SCSI read command, and a SCSI read capacity command. The commands may then be transferred from the user application to a storage controller component (e.g., the disk allocation and control component 480) to instruct the storage controller component to write to, and/or read from, storage disks or Managed Disks (MDisks). For example, a SCSI write command can instruct the storage controller component to write to MDisks, while a SCSI read command can instruct the storage controller component to read from MDisks and forward read data back to a user application. A SCSI read capacity command instructs the storage controller to return a size or capacity of an MDisk to a user application.

In accordance with further aspects of the present invention, each of these SCSI commands can be an encryption command and/or a non-encryption command. That is, a SCSI command may indicate to the storage controller component to write to, and/or read from, encrypting MDisks, when sent as an encryption command. Alternatively, a SCSI command can indicate to the storage controller component to write to, and/or read from, non-encrypting MDisks, when sent as a non-encryption command. To indicate to the storage controller component whether a command is a SCSI command, an encryption command, and/or a non-encryption command, the user application can set various fields in a command descriptor block (CDB) sent to the storage controller component, as discussed herein.

Referring now to FIG. 5, a CDB of a SCSI write (16) command 500 can be sent from a user application (e.g., the application 460 in FIGS. 4A-4B) to a storage controller component (e.g., the data allocation and control component 480), to instruct the storage controller component to write input data of the user application in a storage disk or Managed Disk (MDisk). The write (16) command 500 is 16 bytes long. At byte 0, an operation code field indicates that the CDB is of a SCSI write (16) command 500. At bytes 2-9, a logical block address (LBA) field indicates an address of a logic block of memory (e.g., of a data-out buffer of the user application) where the input data is stored and may be obtained. At bytes 10-13, a transfer length field indicates a size of the input data that is to be obtained. Each of the LBA and the transfer length fields include a most significant bit (MSB) and a least significant bit (LSB). At byte 15, a control field includes control information that is required to be transferred between the user application and the storage controller component to transfer the write command 500 and the input data.

In embodiments, at byte 14, a group number field indicates that the CDB is of a particular group of commands (e.g., a SCSI group of commands), and can indicate to the storage controller component that the input data may require access of an encrypting MDisk. The storage controller component can read, at byte 1, bit 6, a write/read protect ("WRPROTECT") field that indicates whether the write command 500 is an encryption command or a non-encryption command. If the write/read protect field is set to true (e.g., indicates that the write command 500 is an encryption command), then the storage controller component writes input data received from the user application to an encrypting MDisk. Otherwise, the storage controller component writes the input data to a non-encrypting MDisk. The storage controller component may read the next 5 bits of byte 1 to select one of different encryption algorithms provided by the storage controller component and/or encrypting MDisks, such as the encrypting disk 430 in FIGS. 4A-4B. For example, byte 1, bit 4 can include a Disable Page Out (DPO) field that allows the application to warn the storage controller component that the data being written is unlikely to be read back soon and so is not worth keeping in the storage controller component's cache, e.g., the cache 470 in FIG. 4B. At byte 1, bits 3 and 1, a Force Unit Access (FUA) field and a second Force Unit Access non-volatile (FUA_NV) field tell the storage controller component to immediately send the data to a MDisk and to not buffer it through the cache. If the encrypting MDisk is full before the input data is written into the encrypting MDisk, the storage controller component may return a disk full signal to the user application and may stop writing the input data into the encrypting MDisk.

Referring now to FIG. 6, a CDB of a SCSI read (16) command 600 can be sent from a user application (e.g., the application 460 in FIGS. 4A-4B) to a storage controller component (e.g., the data allocation and control component 480), to instruct the storage controller component to read requested data from a storage disk or Managed Disk (MDisk) and forward the read data back to the user application. The read (16) command 600 is 16 bytes long. At byte 0, an operation code field indicates that the CDB is of a SCSI read (16) command 600. At bytes 2-9, a logical block address (LBA) field indicates an address of a logic block of memory (e.g., of the MDisk) where the requested data is stored and may be obtained from. At bytes 10-13, a transfer length field indicates a size of the input data that is to be obtained. Each of the LBA and the transfer length fields include a most significant bit (MSB) and a least significant bit (LSB). At byte 15, a control field includes control information that is required to be transferred between the user application and the storage controller component to transfer the read command 600 and the read data.

In embodiments, at byte 14, a group number field indicates that the CDB is of a particular group of commands (e.g., a SCSI group of commands), and can indicate to the storage controller component that the input data may require access of an encrypting MDisk. The storage controller component can read, at byte 1, bit 6, a write/read protect ("WRPROTECT") field that indicates whether the read command 600 is an encryption command or a non-encryption command. If the write/read protect field is set to true (e.g., indicates that the read command 600 is an encryption command), then the storage controller component decrypts and reads data from an encrypting MDisk. Otherwise, the storage controller component reads data from a non-encrypting MDisk. The storage controller component may read the next 5 bits of byte 1 to select one of different decryption algorithms provided by the storage controller component and/or encrypting MDisks, such as the encrypting disk 430 in FIGS. 4A-4B. For example, byte 1, bit 4 can include a Disable Page Out (DPO) field that allows the application to warn the storage controller component that the data being read is unlikely to be requested again soon and so is not worth keeping in the storage controller component's cache, e.g., the cache 470 in FIG. 4B. At byte 1, bits 3 and 1, a Force Unit Access (FUA) field and a Force Unit Access non-volatile (FUA_NV) field tell the storage controller component to read the data from a MDisk and to not use a copy from the cache.

Referring now to FIG. 7, a CDB of a SCSI read capacity (16) command 700 can be sent from a user application (e.g., the application 460 in FIGS. 4A-4B) to a storage controller component (e.g., the data allocation and control component 480), to instruct the storage controller component to return to the user application a size or capacity of one or more extents in a storage disk or Managed Disk (MDisk). The read capacity (16) command 700 is 16 bytes long. At byte 0, an operation code field indicates that the CDB is of a SCSI read capacity (16) command 700. At bytes 2-9, a logical block address (LBA) field indicates an address of a logic block of memory (e.g., of the MDisk) to be measured for size. At bytes 10-13, an allocation length field indicates a maximum size the application has allocated for returned parameter (size) data. Each of the LBA and the allocation length fields include a most significant bit (MSB) and a least significant bit (LSB). At byte 15, a control field includes control information that is required to be transferred between the user application and the storage controller component to transfer the read capacity command 700 and the size data.

In embodiments, the read capacity command 700 can be an encryption command that instructs the storage controller component to return to the user application a size of one or more extents in an encrypting MDisk. At byte 14 of the read capacity command 700, a partial medium indicator (PMI) field can indicate whether the user application requests the storage controller component to return a last LBA beyond which if the user application attempts to write to the last LBA, a disk full signal would be returned to the user application. In the case where the read capacity command 700 is an encryption command, the PMI field may indicate whether the user application requests for a last LBA of a secure, encrypting MDisk.

Figure 8:
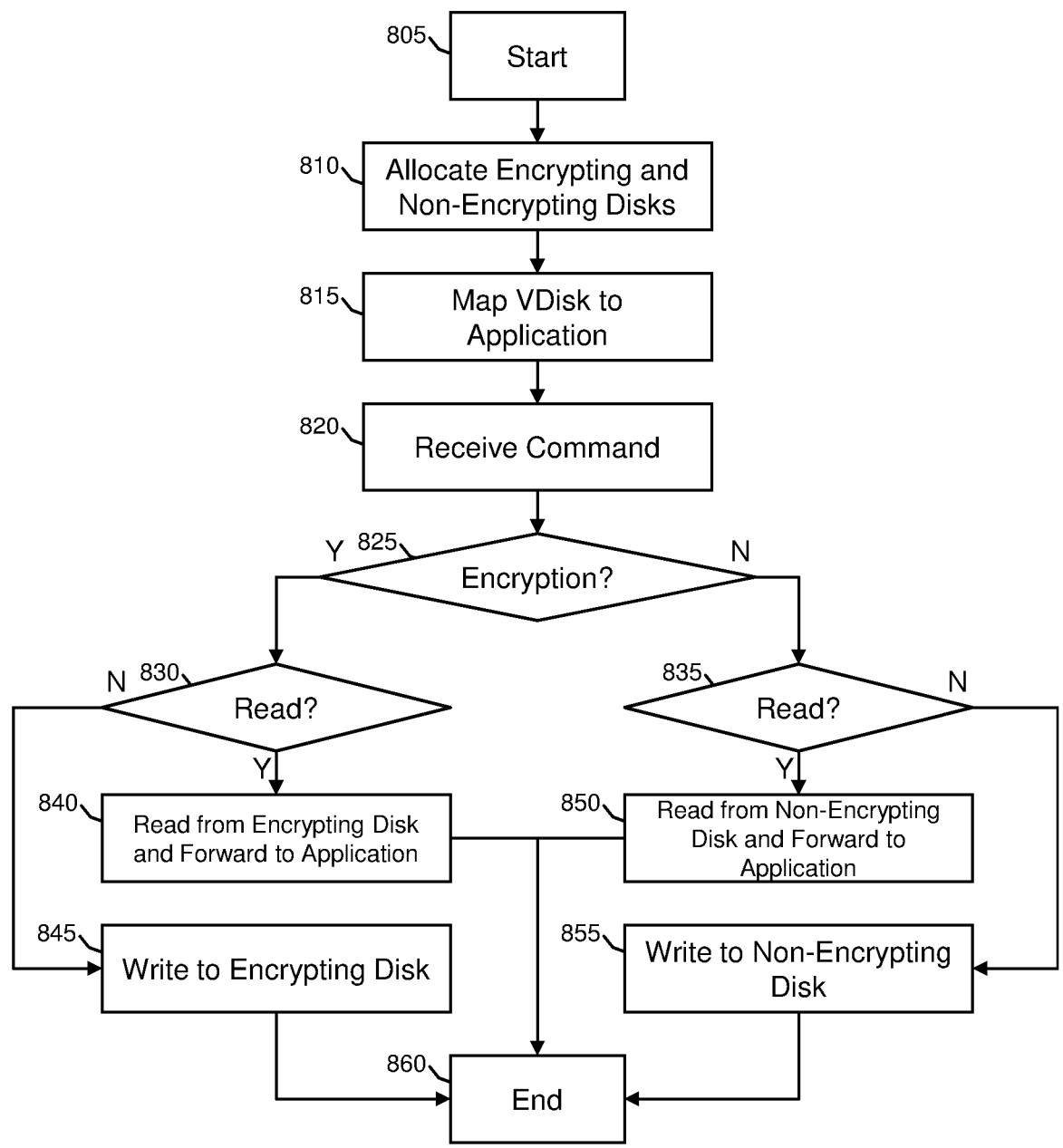
FIGS. 8-9 depict exemplary flow diagrams according to embodiments of the present invention.
Figure 9:
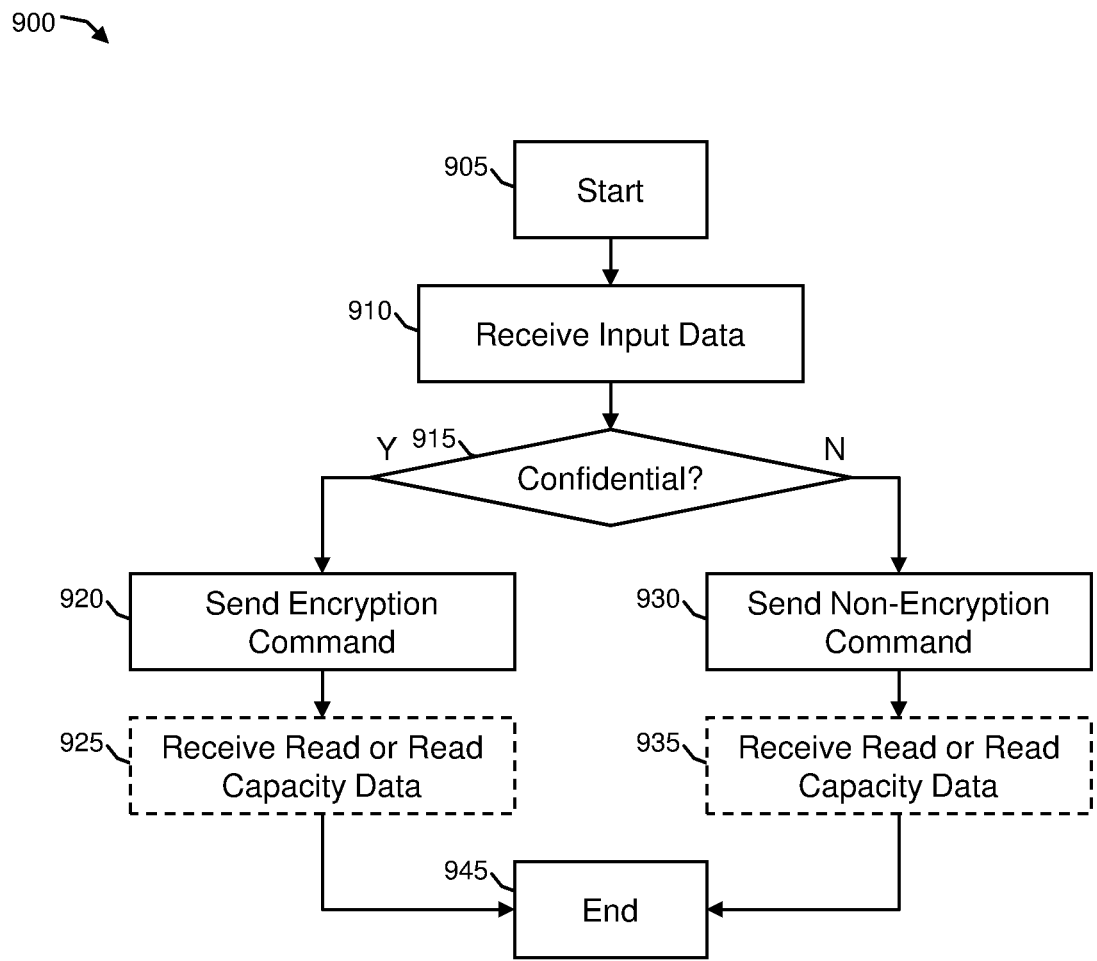

FIGS. 8-9 show exemplary flows for performing aspects of the present invention. The steps of FIGS. 8-9 may be implemented in the environments of FIGS. 1-4, for example.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Furthermore, the invention can take the form of a computer program product accessible from a computer-usable or computer-readable medium providing program code for use by or in connection with a computer or any instruction execution system. The software and/or computer program product can be implemented in the environments of FIGS. 1-4. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disc-read/write (CD-R/W) and DVD.

FIG. 8 depicts an exemplary flow for a process 800 in accordance with aspects of the present invention. In embodiments, the process 800 can be performed by one or more storage controller components, such as the storage visualization component 475 and the disk allocation and control component 480 in FIG. 4B. At step 805, the process starts. At step 810, the storage controller component allocates at least one extent or area of an encrypting storage disk or Managed Disk (MDisk) and at least one extent of a non-encrypting storage disk, to a MDisk group, which is used to create a Virtual Disk (VDisk). In embodiments, the storage controller component can allocate a predetermined percentage and/or a predetermined size of the MDisk group to include encrypting MDisks such that a user application (e.g., the application 460 in FIGS. 4A-4B) can definitely store its confidential or personal data into the encrypting MDisks. At step 815, the storage controller component maps the VDisk to the user application for use by the user application.

At step 820, the storage controller component receives an input/output (I/O) command from the application. In embodiments, the I/O command can include a SCSI write command, a SCSI read command, and/or a SCSI read capacity command. For example, the SCSI write command may instruct the storage controller component to write input data of the user application into a MDisk, while the SCSI read command may instruct the storage controller component to read data from a MDisk and return the data to the user application. The SCSI read capacity command can instruct the storage controller component to return to the user application a size or capacity of a MDisk. In accordance with further aspects of the present invention, the I/O command may also be an encryption command and/or a non-encryption command. For instance, the encryption command can indicate to the storage controller component that data should be written to, or read from, a secure, encrypting MDisk. The non-encryption command may indicate to the storage controller component that data should be written to, or read from, a non-secure, non-encrypting MDisk.

At step 825, the storage controller component determines whether the received I/O command is an encryption command (as opposed to a non-encryption command). If the received I/O command is an encryption command, then the process continues at step 830. Otherwise, the process continues at step 835. At step 830, the storage controller component determines whether the received encryption command is a read command and/or a read capacity command (as opposed to a write command). If the received encryption command is read command and/or a read capacity command, then the process continues at step 840. Otherwise, the process continues at step 845. At step 835, the storage controller component determines whether the received non-encryption command is a read command and/or a read capacity command (as opposed to a write command). If the received non-encryption command is read command and/or a read capacity command, then the process continues at step 850. Otherwise, the process continues at step 855.

At step 840, the storage controller component reads data from an encrypting MDisk and forwards the read data to the user application. Alternatively, in response to a SCSI read capacity command that is an encryption command, the storage controller component can read a size or capacity of an encrypting MDisk and return the size data to the user application. In embodiments, to read data from an encrypting MDisk, the storage controller component may decrypt the received data with keys stored in a look-up table in the storage controller component. The process continues at step 860.

At step 845, the storage controller component writes input data of the application into an encrypting MDisk. In embodiments, the input data can be included in a respective SCSI write command, and/or can be retrieved from a data-out buffer of the user application via a logical block address (LBA) of the input data in the buffer that is included in the respective SCSI write command. The process continues at step 860.

At step 850, the storage controller component reads data from a non-encrypting MDisk and forwards the read data to the user application. Alternatively, in response to a SCSI read capacity command that is an encryption command, the storage controller component can read a size or capacity of a non-encrypting MDisk and return the size data to the user application. The process continues at step 860.

At step 855, the storage controller component writes input data of the application into a non-encrypting MDisk. In embodiments, the input data can be included in a respective SCSI write command, and/or can be retrieved from a data-out buffer of the user application via a LBA of the input data in the buffer that is included in the respective SCSI write command. The process continues at step 860. At step 860, the process ends.

FIG. 9 depicts an exemplary flow for a process 900 in accordance with aspects of the present invention. In embodiments, the process 900 can be performed by a user application on a mobile computing device, such as the application 460 on the mobile computing device 54A, 54B, 54C, or 54N, in FIGS. 4A-4B. At step 905, the process starts. At step 910, the user application receives input data from a user of the application. At step 915, the user application determines whether the received input data is tagged as confidential (e.g., personal) by the user. In embodiments, the user application can determine whether to tag the received input data as confidential based on predetermined rules. If the user application determines either that the received input data is tagged as confidential by the user, or to tag the received input data as confidential, the process continues at step 920. Otherwise, the process continues at step 930.

At step 920, the user application sends an encryption command to a storage controller component, such as the disk allocation and control component 480 in FIG. 4B. In embodiments, the encryption command can include, for example, an encryption read command that instructs the storage controller component to decrypt and read data from an encrypting MDisk. The encryption command can also include, for instance, an encryption write command that instructs the storage controller component to write the confidential input data into an encrypting MDisk. The encryption command may include an encryption read capacity command that instructs the storage controller component to determine and return a size or capacity of an encrypting MDisk. The process continues at step 930.

At optional step 925, the user application can receive read data and/or read capacity data from the storage controller component. The read data and the read capacity data may be sent from an encrypting MDisk and in response to an encryption read command and/or an encryption read capacity command sent from the user application to the storage controller component. The process continues at step 940.

At step 930, the user application sends a non-encryption command to the storage controller component. In embodiments, the non-encryption command can include, for example, a non-encrypting read command that instructs the storage controller component to read data from a non-encrypting MDisk. The non-encryption command can also include, for instance, a non-encrypting write command that instructs the storage controller component to write non-confidential input data into a non-encrypting MDisk. The non-encryption command may include a non-encrypting read capacity command that instructs the storage controller component to determine and return a size or capacity of a non-encrypting MDisk. The process continues at step 935.

At optional step 935, the user application can receive read data and/or read capacity data from the storage controller component. The read data and the read capacity data may be sent from a non-encrypting MDisk and in response to a non-encrypting read command and/or a non-encrypting read capacity command sent from the user application to the storage controller component. The process continues at step 940. At step 940, the process ends.

In embodiments, a service provider, such as a Solution Integrator, could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims, if applicable, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principals of the invention and the practical application, and to enable others of ordinary skill in the art to understand the invention for various embodiments with various modifications as are suited to the particular use contemplated. Accordingly, while the invention has been described in terms of embodiments, those of skill in the art will recognize that the invention can be practiced with modifications and in the spirit and scope of the appended claims.

What is claimed is:

1. A method, comprising:
    mapping a virtual disk to an application to allow access of at least one secure storage disk and at least one non-secure storage disk by the application; and
    accessing the at least one secure storage disk and the at least one non-secure storage disk based on the mapping of the virtual disk to the application, to write or read input data into a respective one of the at least one secure storage disk and the at least one non-secure storage disk,
    wherein the application determines whether the input data is confidential data or non-confidential data based on a plurality of predetermined rules of the input data and tags the confidential data,
    a determination to write or read the confidential and the non-confidential data to one of the at least one secure storage disk and the at least one non-secure storage disk is based on a read or write encryption command received from the application and a read or write non-encryption command received from the application,
    the read or write encryption command received from the application includes an encryption read capacity command to determine and return a size or capacity of the at least one secure storage disk, and
    the read or write non-encryption command received from the application includes a non-encryption read capacity command to determine and return the size or the capacity of the at least one non-secure storage disk.

2. The method of claim 1, further comprising allocating the at least one secure storage disk and the at least non-secure storage disk with a predetermined percentage of segments of the at least one secure storage disk.

3. The method of claim 1, further comprising allocating of the at least one secure storage disk and the at least non-secure storage disk with a predetermined number of segments of the at least one secure storage disk.

4. The method of claim 1, wherein:
    the at least one secure storage disk comprises at least one encrypting storage disk operable to self-encrypt data written to the at least one encrypting storage disk; and
    the at least one non-secure storage disk comprises at least one non-encrypting storage disk.

5. The method of claim 1, further comprising:
    reading the confidential data from at least one segment of the at least one secure storage disk based on an encryption read command received from the application; and
    forwarding the read confidential data to the application.

6. The method of claim 1, further comprising
    reading the size of the at least one secure storage disk based on the encryption read capacity command received from the application; and
    forwarding the read size to the application.

7. The method of claim 1, further comprising writing the confidential data to at least one segment of the at least one secure storage disk based on an encryption write command received from the application.

8. The method of claim 1, further comprising:
    reading the non-confidential data from at least one segment of the at least one non-secure storage disk based on a non-encrypting read command received from the application; and
    forwarding the read non-confidential data to the application.

9. The method of claim 1, further comprising writing the non-confidential data to at least one segment of the at least one non-secure storage disk based on a non-encrypting write command received from the application.

10. The method of claim 1, further comprising allocating a predetermined percentage of the at least one storage disk and the at least one non-secure storage disk to the at least one secure encrypting storage disk.

11. The method of claim 10, further comprising reading the confidential data from the at least one secure encrypting storage disk by decrypting confidential data with at least one key stored in a look-up table.

12. The method of claim 11, further comprising outputting a disk full signal in response to a capacity of the at least one secure encrypting storage disk being full.

13. The method of claim 12, further comprising preventing data from being written to the at least one secure encrypting storage disk in response to the disk full signal being output and maintaining the look-up table including a plurality of keys and a plurality of IP addresses for the at least one secure encrypting storage disk and the at least one non-encrypting storage disk, wherein the read or write encryption command received from the application includes a write encryption command which retrieves the input data from a data-out buffer of a user application via a logical block address of the input data in the data-out buffer.

14. A system comprising a computer hardware infrastructure which comprises a processor, a memory storing instructions, and the processor being coupled to the memory to execute the instructions to perform the functions of the computer hardware infrastructure comprising:
 associating a virtual disk to an application on a computing device, the virtual disk associated with at least one encrypting storage disk and at least one non-encrypting storage disk, and used by the application to access of the at least one encrypting storage disk and the at least one non-encrypting storage disk;
 accessing one of the at least one encrypting storage disk and the at least one non-encrypting storage disk based on the associating of the virtual disk to the application, to write or read confidential or non-confidential data associated with the application into a respective one of the at least one encrypting storage disk and the at least one non-encrypting storage disk; and
 outputting a disk full signal in response to a capacity of the at least one encrypting storage disk being full,
 wherein the application determines whether input data to the application is confidential data or non-confidential data based on a plurality of predetermined rules of the input data and tags the confidential data,
 a determination to write or read the confidential and the non-confidential data to one of the at least one encrypting storage disk and the at least one non-encrypting storage disk is based on a read or write encryption command received from the application and a read or write non-encryption command received from the application,
 the read or write encryption command received from the application includes an encryption read capacity command to determine and return a size or the capacity of the at least one encrypting storage disk, and
 the read or write non-encryption command received from the application includes a non-encryption read capacity command to determine and return the size or the capacity of the at least one non-secure storage disk.

15. A computer program product comprising a computer readable hardware storage device having readable program code stored on the computer readable hardware storage device, the program code comprising:
 program code to map a virtual disk to an application to allow access of at least one secure storage disk and at least one non-secure storage disk by the application;
 program code to access the at least one secure storage disk and the at least one non-secure storage disk based on the mapping of the virtual disk to the application, to write or read input data into a respective one of the at least one secure storage disk and the at least one non-secure storage disk,
 wherein the application determines whether the input data is confidential data or non-confidential data based on a plurality of predetermined rules of the input data and tags the confidential data,
 program code to determine to write or read the confidential and the non-confidential data to one of the at least one secure storage disk and the at least one non-secure storage disk is based on a read or write encryption command received from the application and a read or write non-encryption command received from the application,
 the read or write encryption command received from the application includes an encryption read capacity command to determine and return a size or capacity of the at least one secure storage disk, and
 the read or write non-encryption command received from the application includes a non-encryption read capacity command to determine and return the size or the capacity of the at least one non-secure storage disk.

\* \* \* \* \*